United States Patent [19]
Ward

[11] Patent Number: 5,172,794
[45] Date of Patent: Dec. 22, 1992

[54] ADJUSTABLE DAMPING SHOCK ABSORBER

[75] Inventor: Michael Ward, Brampton, Canada

[73] Assignee: Maremont Corporation, Carol Stream, Ill.

[21] Appl. No.: 680,084

[22] Filed: Apr. 3, 1991

[51] Int. Cl.$^5$ ............................................. F16F 9/44
[52] U.S. Cl. ............................ 188/299; 188/322.13
[58] Field of Search ............................ 188/311–319, 188/299, 322.13, 322.17

[56] References Cited

U.S. PATENT DOCUMENTS

| | | | |
|---|---|---|---|
| 2,048,037 | 7/1936 | Smith | 188/318 X |
| 2,788,092 | 4/1957 | Whisler | 188/320 |
| 4,660,689 | 4/1987 | Hayashi et al. | 188/322.13 X |
| 4,732,244 | 3/1988 | Verkuylen | 188/318 |

FOREIGN PATENT DOCUMENTS

| | | | |
|---|---|---|---|
| 1146705 | 4/1963 | Fed. Rep. of Germany | 188/315 |
| 1159781 | 12/1963 | Fed. Rep. of Germany | 188/315 |
| 1292014 | 4/1969 | Fed. Rep. of Germany | 188/315 |
| 816092 | 4/1937 | France | 188/318 |

Primary Examiner—Robert J. Oberleitner
Assistant Examiner—Alfred Muratori
Attorney, Agent, or Firm—McAndrews, Held & Malloy, Ltd.

[57] ABSTRACT

A piston and cylinder type shock absorber that accomplishes readily adjustable damping by employing an externally controlled flow path between the rebound chamber and the reservoir of the shock absorber. A relatively simple inexpensive valving mechanism controls flow through this path and is disposed in the inner cylinder head of the shock absorber so that it may be readily and easily manipulated from outside the shock absorber.

7 Claims, 4 Drawing Sheets

ADJUSTABLE DAMPING SHOCK ABSORBER

BACKGROUND OF THE INVENTION

The present invention relates to piston and cylinder type shock absorbers, and more particularly, to shock absorbers of the type described that are adapted for use with the seat of a truck or similar motor vehicle and that permit adjustable damping.

In the past, fluid has been allowed to enter and leave the so-called compression chamber and rebound chamber defined or formed in the cylinder of piston and cylinder type shock absorbers, either through the piston or through a passage or passages that provide communication between the chambers in the cylinder and a reservoir. The damping characteristics of such shock absorbers are determined by the rate at which fluid is permitted to enter and leave the chambers of the cylinder. This rate, in turn, controls the speed at which the piston may move in the cylinder responsive to the external forces applied to the shock absorber.

Those working in the art have long recognized the desirability of being able to change or adjust the rate of fluid flow so that the damping characteristics of a shock absorber of this type may be changed to accommodate different, anticipated conditions. Adjustable damping shock absorbers have been proposed in the past and have included mechanisms for selectively changing the rate of fluid flow. These prior mechanisms share the disadvantages of requiring structurally complex individual components, entire mechanisms, or both. The complexity is a result of the need to provide adjustment of the primary fluid flow path of the shock absorber, the inaccessibility of the location of the flow adjustment, and the need to provide for adjustment over a wide range of flows. This complexity results in relatively high fabrication or assembly costs.

Additionally in many of these prior mechanisms, adjustment of the flow rate requires the collapsing of the shock absorber and rotation of the piston against a retaining mechanism. Others require careful adjustment and securing of the mechanism. This need to so manipulate the shock absorber or mechanism control member to adjust the damping characteristics has made these prior shock absorbers not only expensive but difficult to commercialize.

More specifically, these prior proposed adjustable damping shock absorbers have included fluid flow control mechanisms having an externally adjustable member to reduce or restrict the area of an orifice, and thereby control the rate of flow through the orifice. An example of a mechanism for positioning orifice restricting rods within the orifices in a piston and within a reservoir flow passage are described in U.S. Pat. No. 2,780,321.

A reservoir fluid flow control mechanism having a hollow, cylindrical metering pin that is mounted in a larger diameter cylindrical bore is described in U.S. Pat. No. 4,214,737. The pin has a radial passage extending from its side wall to an axial central passage. The pin is eccentrically positioned in the bore so that the pin contacts the bore side wall. The bore includes a side wall opening through which fluid may flow into the bore. Flow into and through the pin is adjustably controlled by rotating the pin in the bore from a fully open position where the pin is positioned opposite the bore side wall opening to a fully closed position where the portion of the pin contacting the bore side wall substantially covers the side wall opening.

Another patented flow control mechanism, described in U.S. Pat. No. 4,164,274, has a cylindrical chamber that includes radial openings communicating with the shock absorber cylinder and reservoir. A valve spool, with annular lands, is disposed in the chamber and is in close slidable contact with the chamber side wall. An externally adjustable assembly is used to axially move the valve spool within the chamber so that the spool valve lands cover and uncover the radial openings.

U.S. Pat. Nos. 3,937,307, 4,043,435, and 4,232,767 several other flow control mechanisms for selectively covering and uncovering fluid flow passages extending through a shock absorber piston. Each mechanism is adjusted by rotating a flat closing member disposed perpendicular to the axis of the piston.

Mechanisms which vary the pressure required to open valves in the fluid passages through shock absorber pistons have also been used to provide adjustable damping for the shock absorbers. A mechanism to vary the height of a coil spring seat of a shock absorber piston valve is disclosed by U.S. Pat. No. 2,788,092. Similarly, U.S. Pat. No. 4,298,102 describes a mechanism for adjusting the height of a valve seat in a passage through a shock absorber piston so as to limit the opening of a flexible valve element.

SUMMARY OF THE INVENTION

In principle aspect, the improved piston and cylinder shock absorber of the present invention accomplishes adjustable damping by employing an externally controlled flow path between the rebound chamber and the reservoir. Flow through this path can be controlled by a relatively simple and inexpensive valving mechanism that is disposed in the inner cylinder head of the shock absorber and that may be readily and easily manipulated from without the shock absorber. The employment of this externally controlled flow path overcomes the problems and disadvantages of the prior proposed adjustable shock absorbers.

Accordingly, it is an object of the present invention to provide an improved piston and cylinder type shock absorber wherein its damping characteristics may be readily and quickly changed from outside the shock absorber and wherein the mechanism for permitting the facile adjustment of the damping characteristics may be economically manufactured.

Another object of this present invention is to provide an adjustable damping shock absorber of the type described wherein this improved shock absorber includes: a reciprocally movable piston disposed in an inner cylinder; a compression head covering one end of the inner cylinder and defining a compression chamber in the inner cylinder between the piston and the compression head; an outer cylinder surrounding the inner cylinder and forming an annular reservoir between the cylinders, an end cap covering the one end of the outer cylinder and the compression head, a piston rod extending from the piston coaxially with the cylinders in the direction opposite the compression head; and an inner cylinder head covering the other, rod ends of the cylinders, defining a rebound chamber in the inner cylinder between the piston and the inner cylinder head and having a hole through which the rod extends in close slidable, sealing contact wherein damping is achieved by fluid flow through passages, and valves in the passages, in the piston and between the compression chamber and the reservoir; and wherein the damping characteristics of the shock absorber may be readily adjusted by providing a fluid flow path which extends between the rebound chamber and the reservoir and which has an externally adjustable valve or valve pin therein to control the flow of fluid through this fluid flow path.

A further object is to provide an adjustable damping shock absorber of the type described which consists of a relatively simple and inexpensive valve and wherein the user of the improved shock absorbers may easily select the desired damping characteristics by manipulating a portion of the valve that projects or extends without the shock absorber.

A still further object of the present invention is to provide an improved adjustable damping shock absorber of the type described wherein the shock absorber includes a gas purging passage between the rebound chamber and the reservoir which allows minimal fluid flow or flow of entrapped gas in the inner cylinder to escape the rebound chamber and flow to the reservoir; and wherein a movable cylindrical valve or valve pin is disposed in a fluid flow path for controlling the flow therethrough. A related object of the present invention is to provide an improved adjustable damping shock absorber of the type described wherein the cylindrical valve pin is disposed in the inner cylinder head and may be moved, about its longitudinal axis, between a first position where flow is substantially prevented through the second path, a second position where limited flow is permitted, and a third position where there is increased flow, through the second and third position paths; and wherein one end of the cylindrical valve pin projects from the inner cylinder head and may be readily and easily grasped by the user of the shock absorber for rotational movement about the longitudinal axis of the valve pin between the three positions.

These and other objects and advantages of the present invention will become apparent from a reading of the following description of the preferred embodiment of the present invention.

BRIEF DESCRIPTION OF THE DRAWINGS

The preferred embodiment of the present invention is described in connection with the accompanying drawings wherein.

DETAILED DESCRIPTION OF THE PREFERRED EMBODIMENT

Figures 1, 2:
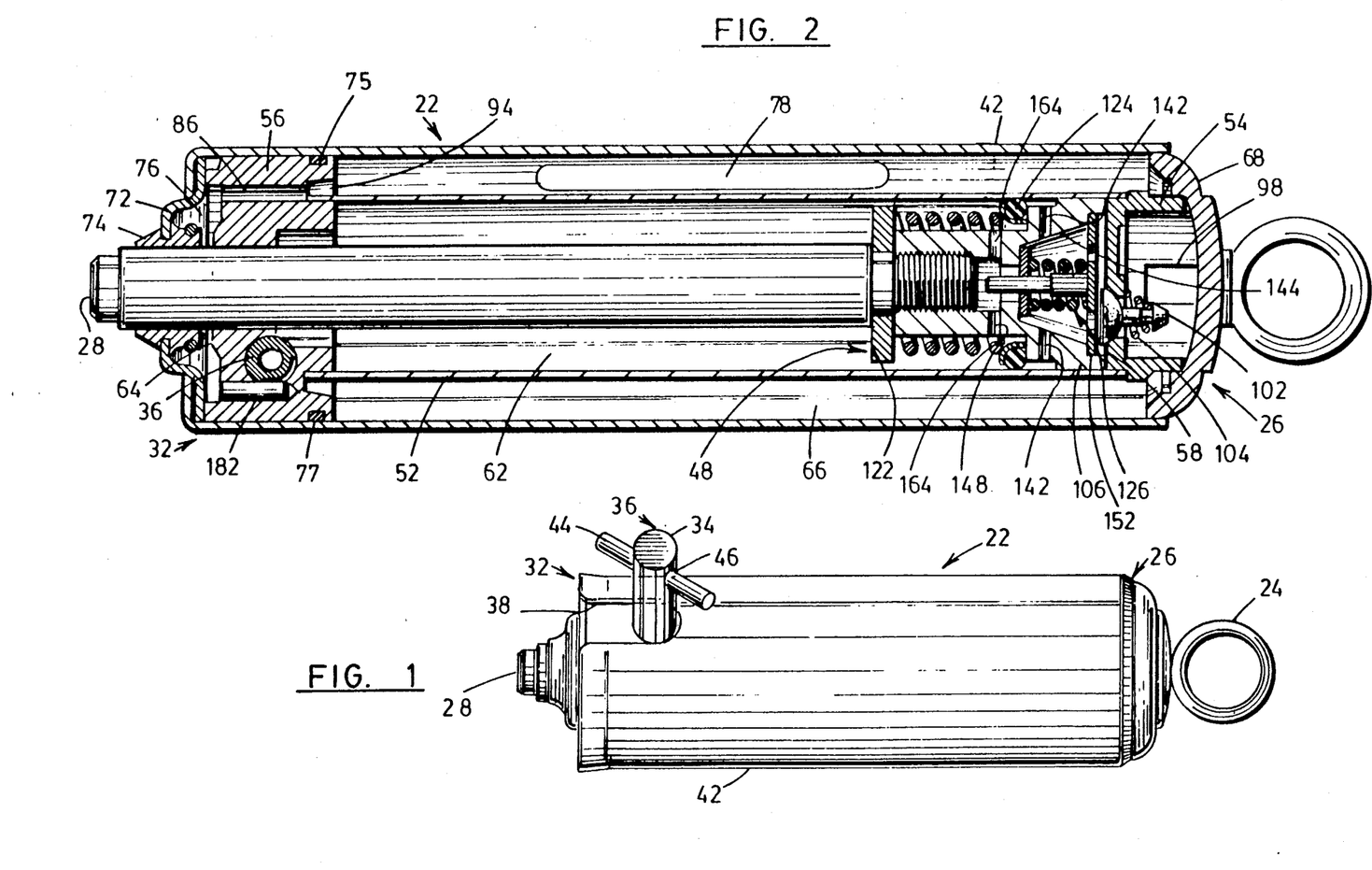
FIG. 1 shows an adjustable damping shock absorber according to the present invention, with the projecting end of the cylindrical valve pin extending through the outer cylinder of the shock absorber.
FIG. 2 is a partial, longitudinal cross sectional view of the shock absorber of FIG. 1, taken on a diametrical plane that is perpendicular to the longitudinal axis of the valve pin.

An adjustable damping shock absorber, embodying the present invention, is generally shown at 22 in FIG. 1, and is used to provide damping for the seat of a motor vehicle. Except as noted below, the structure of the shock absorber 22 is conventional.

In use, an attachment ring 24, mounted on the one, closed end 26 of the shock absorber, is connected with brackets (not shown). A piston rod 28 extends out of the other, rod end 32 of the shock absorber 22 and is also attached, at its distal end, to other brackets in a conventional manner.

The damping characteristics of shock absorber 22 may be adjusted, or changed by rotating the projecting end 34 of a cylindrical valve pin 36, about its longitudinal axis, as described below. As illustrated in FIG. 1, the end 34 projects through a slot 38 in the rod end of the outer cylinder 42 of the shock absorber. To facilitate the rotation of the valve pin 36, a lever, or cross member 44 extends from and is disposed in a transverse bore 46 in the projecting end 34 of the valve pin. The valve pin 36 provides a facile means for externally adjusting the damping characteristics of shock absorber 22 as described below.

Figure 3:
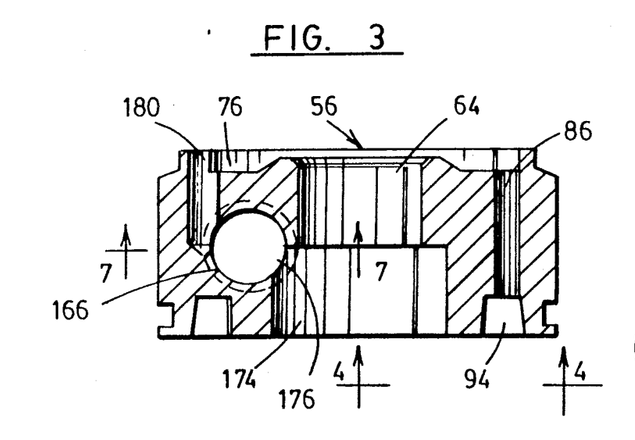
FIG. 3 is a cross sectional view of the inner cylinder head of the shock absorber of FIG. 1 and taken along the same plane as view shown in FIG. 2.
Figure 4:
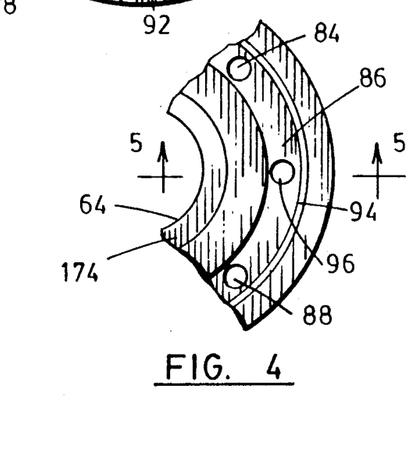
FIG. 4 is a partial axial view taken along the line 4—4 in FIG. 3.

Referring now to FIGS. 2 and 3, the shock absorber 22 includes a piston assembly 48 disposed within an inner cylinder 52. The assembly 48 is adapted to be reciprocally moved, parallel with the longitudinal axis of the inner cylinder 52, within the inner cylinder.

A generally cup-shaped compression head 54 closes one end of the inner cylinder 52, that is, the end adjacent to the closed end 26 of the shock absorber 22. An inner cylinder head 56 closes the other end of inner cylinder 52, that is, the end adjacent to the rod end 32 of the shock absorber 22.

A compression chamber 58 is defined within the inner cylinder between the compression head 54, and the adjacent facing side of the piston assembly 48. A rebound chamber 62 is likewise defined within the inner cylinder between the inner cylinder head 56 and the adjacent facing side of the piston assembly 48.

The piston rod 28 is connected and moves with the piston assembly 48. It extends into the rebound chamber 62 and projects through a central, close fitting aperture 64 in the inner cylinder head 56. The longitudinal axis of the piston rod 28 is coaxial with the longitudinal axis of the inner cylinder 52. In normal usage, the reciprocal compression and rebound motion of the piston assembly 48 within the cylinder 52 is controlled by the rate at which fluid is allowed to flow into and out of the chambers 58 and 62.

As noted, the shock absorber 22 also includes an outer cylinder 42 which surrounds the inner cylinder 52 so that the longitudinal axes of the cylinders 42 and 52 are coincident. A fluid reservoir 66 for the shock absorber 22 is defined within the annular volume between the inner and outer cylinders.

An end cap 68 and rod packing member 72 form a sealed outer case for the shock absorber 22, with the end cap 68 closing the one end 26 and the packing member 72 closing the other, rod end 32 of the shock absorber 22. The end cap 68 and rod packing member 72 are secured at the ends 26 and 32, respectively, in a conventional manner. The rod packing member 72 supports a central, annular shaft seal 74 that is maintained in close slidable sealing contact with the piston rod 28.

The inner cylinder head 56 is cylindrical and is disposed within the rod end of the outer cylinder 42 so that its outer peripheral surface is in surface-to-surface contact with the outer cylinder. As best seen in FIG. 2, a "fast" swelling elastomeric seal ring 75 resides in circumferential seal ring groove 77 formed in the outer cylindrical surface of the inner head thereby preventing leakage of working fluid between the adjacent surfaces of the outer cylinder 42 and the outer circumferential surface of the inner head 56. The piston rod 28 is slidably received within the central aperture 64 in the inner cylinder head 56. The rod packing member 72 is axially spaced with the inner cylinder head 56 so as to define or form, with the rod end of the outer cylinder 42, leakage chamber 76 therebetween.

As noted, the piston rod 28 extends coaxially within the inner and outer cylinders, from piston assembly 48 through closely contacting openings or apertures in inner cylinder head 56 and the shaft seal 74 held by the rod packing member 72. The entire volume of shock absorber 22 is enclosed by the outer cylinder 42, the end cap 68, and rod packing member 72. The reservoir 66, formed between inner cylinder 52, outer cylinder 42, inner cylinder head 56, end cap 68 and compression head 54, is filled with fluid in a conventional manner. A conventional gas bag 78, containing a compressible gas, is disposed within the reservoir. This gas bag 78 is covered by a membrane that allows gas in the fluid in the reservoir 66 to enter the gas bag but does not allow gas to escape from the gas bag.

Figure 5:
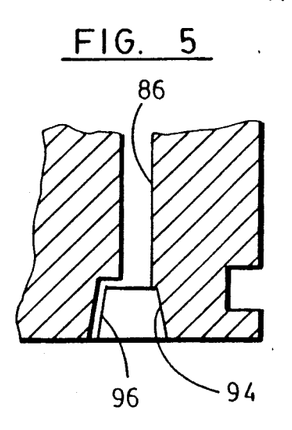
FIG. 5 is a partial sectional elevational view taken along line 5—5 of FIG. 4.
Figure 7:
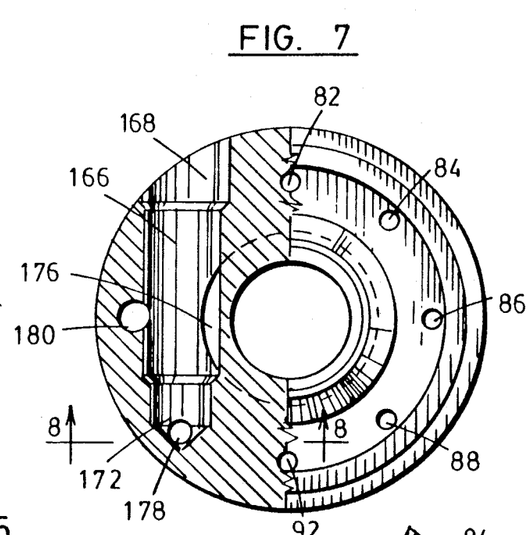
FIG. 7 is a partial cross sectional view of the inner cylinder head taken along the line 7—7 of FIG. 3.

Referring back to the inner cylinder head 56 as illustrated in FIGS. 5 and 7, five axial passages 82, 84, 86, 88 and 92 extend from the leakage chamber 76 toward the rod end of the reservoir 66 and serve to permit fluid to flow between the reservoir and the chamber 76. These axial passages are evenly spaced along a 180° radial arc. Their inner ends, that is, the ends that face reservoir 66, communicate with an enlarged, annular, inwardly facing slot 94 which also snugly receives, along its radial inner surface, the rod end of the inner cylinder 52. The radial outer portion of the slot 94 serves as part of the passage, along with the axial passages, for the flow of fluid between the reservoir 66 and the leakage chamber 76.

As best illustrated in FIG. 5, a "V" shaped groove 96 is formed in the radial inner surface of the slot 94, adjacent to an axial passage 86. The groove 96 extends between the inner end of the axial passage 86 and the rebound chamber 62 and permits purging of the inner cylinder of entrapped gas with negligible affect on normal damping characteristics. In other words, this groove 96 serves as an always open gas purge passage between the rebound chamber 62 and the reservoir 66 although because of the size of the groove, the damping fluid leakage flow is greatly restricted.

The compression head 54 includes multiple openings 98 that allow fluid to flow from the reservoir 66 into the interior of the cup-shaped compression head 54. A conventional replenishing valve 102, mounted in the base of the compression head 54 controls the flow of fluid from the reservoir 66, through the compression head 54 to the compression chamber 58 in the interior of inner cylinder 52. The replenishing valve includes a coil compression spring 104 that biases the valve 102 towards its closed position. Fluid pressure in the reservoir 66, that exceeds the pressure in the compression chamber 58 by an amount greater than that required to overcome the preset closing bias or force of the valve spring 104, causes replenishing valve 102 to open to an extent proportional to the amount that the spring closing bias or force is exceeded. A conventional pressure relief or blow off valve, not shown but located in the compression head limits max pressure in the compression chamber.

As is conventional, the piston assembly 48 includes passages and valves that regulate fluid flow between the compression chamber 58 and the rebound chamber 62. These passages and valves provide a different resistance to piston assembly's travel toward compression head 54 than toward inner cylinder head 56.

Figure 6:
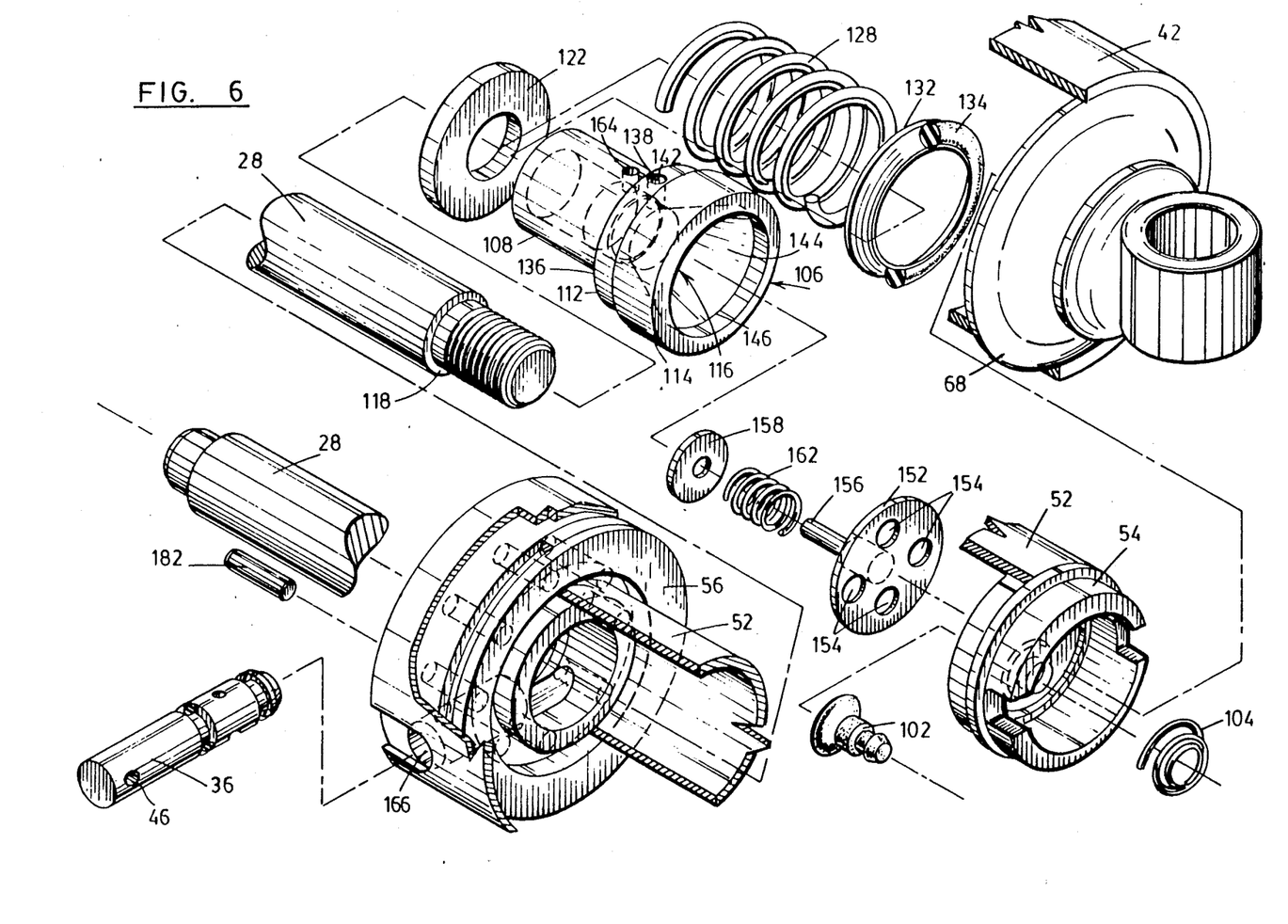
FIG. 6 is an exploded view of the components of the shock absorber of FIG. 1.

The piston assembly 48 is best illustrated in FIGS. 2 and 6 and includes a cylindrical piston member 106 having an inner end portion 108, a central portion 112 and an outer end portion 114 whose radial outer surface is dimensioned so that there is close sliding contact between that surface and inside surface of the inner cylinder 52. The outer end portion is larger, in diameter, than the central portion, and central portion is larger, in diameter, than the inner end portion. The piston member 106 has a central, axial passageway 116 extending therethrough, with the inner end of the passageway, that is, the end within the inner end portion 108, being threaded.

The inner end of the piston rod 28 is threaded, and these threads terminate in a shoulder 118. The piston rod threads cooperate with the threads in the passageway 116 to connect the piston rod 28 with the piston member 106 and to seal and close the inner end of the central passageway 116. A stop ring 122 is held between the piston rod shoulder 118 and the inner end of the piston end portion 108. The radius of the outward facing circumferential surface of the ring 122 is less than the radius of the inner cylinder 52.

Flow of fluid may occur between the compression and rebound chambers 58 and 62 through a bypass valve assembly 124 and a rebound valve assembly 126. The bypass valve assembly 124 allows flow from the compression chamber to the rebound chamber when the pressure in the former exceeds pressure in the latter chamber by a predetermined bypass pressure. The assembly 124 includes a bypass spring 128 that surrounds the inner end portion 108 of the piston 106 and is disposed between the stop ring 122 and an annular ring seal carrier 132 that also fits loosely about the inner end portion. A seal ring seal 134 is supported and carried by the carrier 132. The bias of the spring 128 acts on the carrier 132 and urges the ring seal 134 against a seal protector, not shown, that is supported by shoulder 136, that is formed at the juncture between the inner end portion 108 and central portion 112 and against the inside wall surface of the inner cylinder 52. The bypass spring 128, that is compressed between the piston stop ring 122 and the seal carrier 132 supported by shoulder 136, provides the predetermined bypass force.

An annular space is defined between the inside wall of the inner cylinder 52 and radial outwardly facing surface of the central portion 112 of the piston 106, which annular space is bounded on its inner end by the ring seal 134 and on its outer end by a shoulder 138 formed by the juncture of the central portion 112 and the outer end portion 114 of the piston member 106. As is shown in FIG. 6, radial bypass passages 142 provide communication between this annular space and the central passageway 116 in the interior of piston member 106. The central passageway, in turn, communicates with the compression chamber 58. Fluid pressure in the compression chamber, acting through the passageway 116 and the passages 142, tends to urge ring seal 134, and its carrier 132, against bypass spring 128. When the pressure in the compression chamber 58 exceeds the predetermined bypass force of the spring 128 (plus, of course, the pressure in the rebound chamber 62), the ring seal 134, and its carrier 132, move inwardly away from the shoulder and thereby open a flow path from the compression chamber 58 to the rebound chamber 62. This flow path will remain open as long as the pressure in the compression chamber exceeds the force of the bypass spring 128 and the pressure in the rebound chamber. Otherwise, the ring seal 134 remains seated in contact with protector 137 and shoulder 136 and the inside wall of the inner cylinder 52 thereby preventing fluid flow from the compression chamber 58 to the rebound chamber 62.

The central passageway 116 has an outwardly flared or conical portion 144, adjacent to its outer end; whereas, the remaining portion of the passageway is generally cylindrical with its diameter being smaller than the diameter of the inner end of the flared portion. A radially outwardly extending shoulder 146 is formed at the outer end of the flared portion 144.

The rebound valve assembly 126 allows flow from the rebound chamber 62 to the compression chamber 58 whenever the pressure in the rebound chamber exceeds the pressure in the compression chamber by a predetermined rebound pressure. The assembly 126 includes an annular, outwardly facing rebound valve seat 148 formed at the juncture of the inner end of the flared portion 144 and the remaining portion of the passageway 116. A circular rebound valve retainer disk 152 is permanently mounted in the shoulder 146 and includes four evenly spaced holes 154 that allow unrestricted fluid flow between the compression chamber 58 and the central passageway 116. A rebound valve shaft 156 extends inwardly from the rebound valve retainer disk and coaxially with the passageway 116, past and through the rebound valve seat 148. An annular rebound valve plate 158 is mounted so as to be slidable, reciprocally movable along the valve shaft 156, with a minimum leakage therebetween. A rebound spring 162 is mounted about the shaft 156 and extends between the retainer disk 152 and the valve plate 158. The spring 162 is compressed so that the valve plate 158 is urged into sealing contact with rebound valve seat 148.

Radial passages 164 are formed in the inner end portion 108 of the piston member 106, between the threads on its inner end and the valve seat 148. These passages afford fluid communication between the passageway 116 the exterior of the inner end portion 108, inwardly from the ring seal 134. In other words, these passages 164 permit fluid communication between the compression and rebound chambers whenever the rebound valve assembly 126 is open. Fluid pressure in the rebound chamber 62 urges the rebound valve plate 158 to slide along the shaft 156, away from the seat 148. When the pressure in the rebound chamber exceeds the predetermined rebound pressure, as exerted by the spring 162 (plus the force acting on the plate 158 due to the pressure of the fluid in the compression chamber), the rebound valve plate 158 will be moved away from the seat 148 and fluid communication between the rebound and compression chambers will be permitted.

As illustrated in FIGS. 2 and 6-8, a straight, cylindrical, transverse valve pin bore 166 is drilled or otherwise formed in the head 56 to receive the valve pin 36. This bore 166 extends from the inner end of counterbore 168 inwardly into the head 56, along a chordal plane. The inner end portion 172 of the valve pin bore 166 has a reduced diameter, and is disposed beyond a diametric plane that is perpendicular to the longitudinal axis of the pin bore 166.

Figure 8:
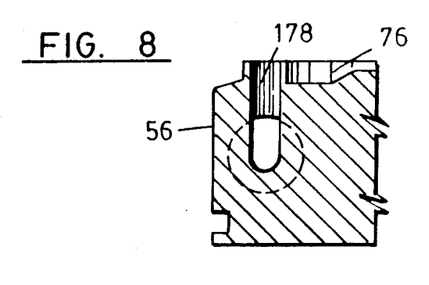
FIG. 8 is a cross sectional view of the inner cylinder head taken along the line 8—8 of FIG. 7.

The inwardly facing end of the inner cylinder head 56 has a circular cylindrical recess 174 surrounding its piston rod receiving central aperture 64. The valve pin bore 166, between its ends, intersects this recess so as to define a relatively small opening 176 between the bore 166 and the recess 174 that affords communication therebetween.

A straight axial bore 178 extends from the inner end of the valve pin bore 166 to the leakage chamber 76.

Figure 12:
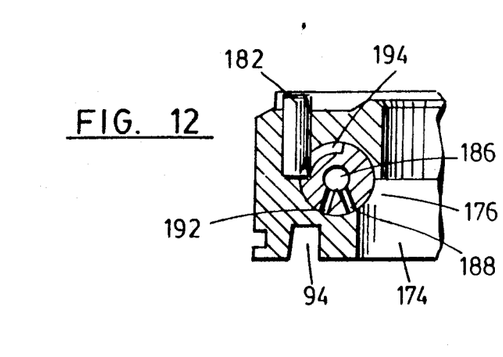
FIG. 12 is a cross sectional view taken along the line 12—12 of FIG. 11 and showing the cylindrical valve pin in its most restricted flow position.

An axial, retaining, roll pin bore 180 is also included in the inner cylinder head 56. As best shown in FIGS. 2, 3 and 7, this bore 180 extends from the outer face of the head 56. Its inner end intersects the valve pin bore 166 opposite the opening 176. A cylindrical retaining roll pin 182 fits snugly within the bore 180 so that a corner portion or arc of its inner end projects into the valve pin bore 166, as shown in FIG. 12.

Figures 9, 10:
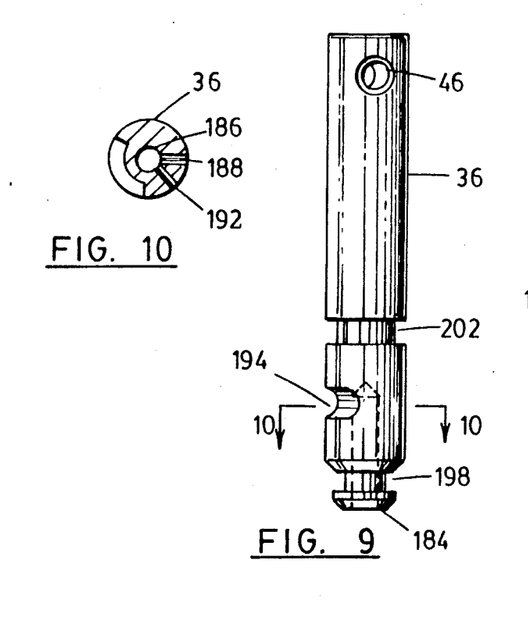
FIG. 9 a side elevational view of the preferred embodiment of the cylindrical valve pin of the shock absorber of FIG. 1.
FIG. 10 is a transverse cross sectional view of the cylindrical valve pin taken along the line 10—10 of FIG. 9.
Figure 11:
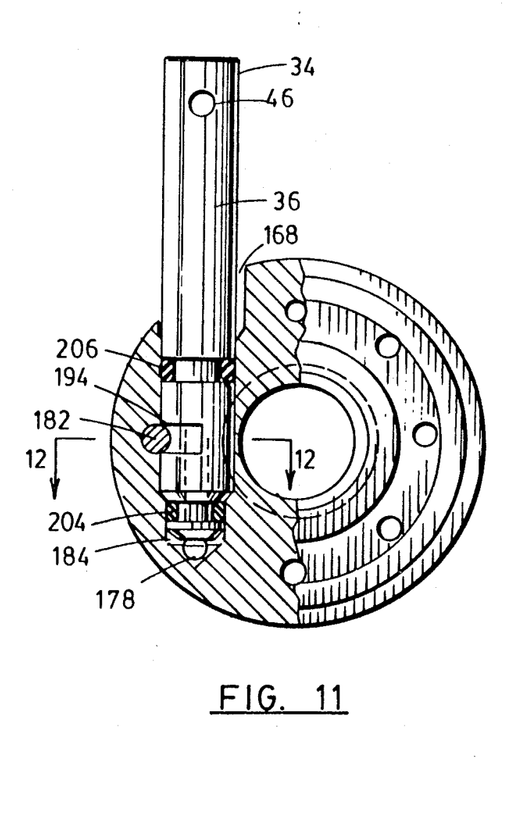
FIG. 11 is a partial cutaway view, generally taken along line 7—7 of FIG. 3, of the inner cylinder head of a shock absorber, with the cylindrical valve pin of FIG. 9 being positioned in its flow path.

The valve pin 36, best illustrated in FIGS. 9, 10 and 11, fits snugly within the interior of valve pin bore 166 with its tapered inner end 184 being adjacent to the axial bore 178 and with its outer end 34 projecting from and beyond the side wall of the inner cylinder head 56. An axial bore is formed within the valve pin 36 and extends from its inner end 184 to the portion of the valve pin adjacent to the opening 176. Two radial bores 188 and 192 are formed in this portion of the pin 36 and communicate, at their inner ends, with the axial bore 186. The bores 188 and 192 can have the same or different cross-sectional areas but each of their diameters is less than one-half of the diameter of axial bore 186. The axes of the bores 188 and 192 extend from the longitudinal axis of the pin 36 in the same transverse or trans-axial plane (that is, a plane perpendicular to the longitudinal axis of the valve pin 36) and along radial lines that are separated from each other by an approximately forty degree arc, in this radial, trans-axial plane.

A peripheral, arcuate slot 194 is formed in valve pin 36 so that it intersects the inner end of the bore 180. The slot 194 extends through an arc of approximately one hundred and seventeen degrees about the periphery of the pin 36, with its closest radial edge being spaced approximately ninety-five degrees from the axis of the bore 188 and fifty-five degrees from the axis of the bore 192. In other words, the slot 194 does not overlap the radial outer ends of the bores 188 and 192.

As noted, the roll pin 182 is mounted in the axial bore 180. Its inner end is disposed within the slot 194 and cooperates with the slot to limit the rotation of the valve pin 36, within its bore 166, to an arc of approximately ninety-five degrees. The roll pin does not otherwise impede the rotation of the valve pin within that arc.

Valve pin 36 is also provided with an annular, transverse groove 198 that is disposed between the transaxial plane of the bores 188 and 192 and the inner end portion 184 of the pin 36. A similar annular, transverse groove 202 is provided between the transverse plane of the bore 188 and 192 and the outer end 34 of the pin 36 (and more specifically, between these bores and the inner end of counterbore 168 of the inner cylinder head 56. Conventional O-rings 204 and 206 are disposed in the grooves 198 and 202, respectively, and serve to prevent the axial leakage of fluid between the bore 166 and the pin 36.

As noted, the valve pin 36 has a transverse bore 46, adjacent to its outer end 34. Lever 44 fits within this bore 46 and serves to facilitate rotating or turning the pin 36, within and with respect to the bore 166, about its longitudinal axis for the reasons hereinafter described.

FIGS. 11-14 best illustrate the various positions of the valve pin 36 within the pin bore 166. The valve pin 36 may be rotated within the bore 166 so as to control flow between rebound chamber 62 and the fluid reservoir chamber 66. In a position shown in FIG. 11, roll pin 182 is abutting the clock-wise end (as shown) of the slot 194 and prevents further rotation of the pin 36 in a clockwise direction. In that position, the outer radial ends of the bores 188 and 192 are adjacent to and substantially blocked by the adjacent wall of the bore 166. Thus only a small amount of fluid may enter or exit from these bores 188 and 192, that is, the fluid that leaks between the bore 166 and pin 36.

Figure 13:
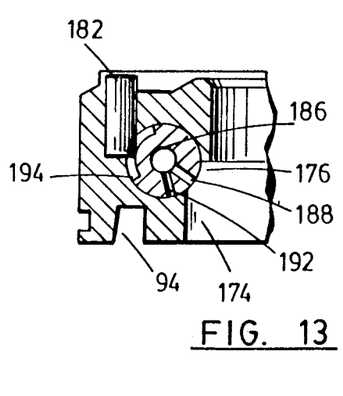
FIG. 13 is a cross sectional view similar to that in FIG. 12 and showing the cylindrical valve pin in an intermedial position permitting flow through one of its radial passages.

In a second position, illustrated in FIG. 13, the valve pin 36 has been rotated counterclockwise from the first position (shown in FIG. 12) so that the bore 188 is in open communication with the opening 176, while the bore 192 is still adjacent to and substantially blocked by the adjacent wall of the bore 166. In this second position, fluid may freely flow through the bore 188, but may only enter bore 192 only after leaking between the pin 36 and the wall of the bore 166. This second position allows substantially more fluid flow between the rebound chamber 62 and reservoir chamber 66, via the bore 188, the bore 186 and the bore 178 than when the valve pin 36 is in its first position (shown in FIG. 12).

Figure 14:
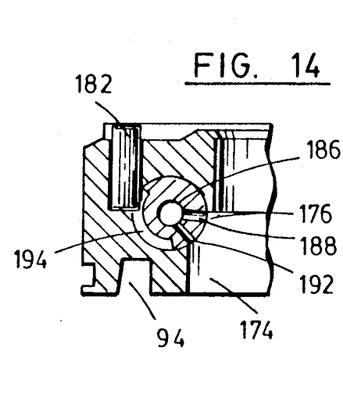
FIG. 14 is a cross sectional view similar to that in FIGS. 12 and 13 and showing the cylindrical valve pin in a position permitting flow through both of its radial passages.

In a third position, illustrated in FIG. 14, the valve pin 36 has been rotated still further counterclockwise from its second position (FIG. 13) so that both bores 188 and 192 are in open communication with opening 176. In this third position, the roll pin 182 abuts the counterclockwise end of the slot 194, thus preventing further counterclockwise rotation of the valve pin 36. This third position allows maximum fluid to flow between the rebound chamber 62 and the reservoir chamber 66 via the bores 188, 192, 186, and 178.

The adjustable flow path thus described through the inner cylinder head 56 may be utilized to regulate the fluid flow between the rebound chamber and the reservoir 66 during both the compression stroke and the rebound stroke of the piston assembly 48. Specifically during a compression stroke of the piston assembly 48, pressure in the compression chamber 58 increases and the replenishing valve 102 remains closed. At a predetermined bypass pressure, the bypass valve assembly 124 opens and allows fluid to enter the rebound chamber from the compression chamber as the piston assembly 48 continues to move toward the compression head 54. As the piston rod 28 increasingly enters the rebound chamber (while the piston assembly continues to move toward the compression head) additional fluid is displaced from the rebound chamber into the reservoir 66. The rate of displacement is dependent on the position of the valve pin 36 within the pin bore 166. This rate of displacement directly affects the damping characteristics of the shock absorber.

Similarly, during a rebound stroke of the piston assembly 48, pressure in the rebound chamber 62 increases and forces fluid to flow from that chamber to the reservoir 66 through the above described flow paths in the inner cylinder head. When the pressure in the rebound chamber exceeds the predetermined rebound pressure, the rebound valve assembly 126 opens and allows fluid to flow from the rebound chamber 62 to the compression chamber 58. Insufficient fluid enters compression chamber 58 through rebound valve assembly 126 to fill the expanding volume beneath the piston assembly 48 during a rebound stroke. The volume of fluid exiting rebound chamber 62 and fluid entering reservoir 66 from rebound volume 62 through the radial bores 188/192, bore 186 and 178 is replaced within compression chamber 58 by flow entering through replenishing valve 102. Again the rates at which fluid may flow from the rebound chamber to the reservoir 66 effects the damping characteristics of the shock absorber.

External adjustment of the rate at which fluid may flow through the adjustable valve pin paths between the rebound chamber and the reservoir permits the user of the shock absorber 22 (as for example, a person sitting on a truck seat that utilizes the shock absorber to dampen road vibrations and bumps) to adjust the fluid flow rate during both compression and rebound strokes. The preferred embodiment of the shock absorber of the present invention, as described hereinabove, provides three different flow rates, and thus three different sets of damping characteristics for the shock absorber.

As will be apparent to those skilled in this art, modifications may be made to the above described preferred embodiment of the present invention. For example, the number of radial flow paths in the valve pin 36 may be increased or decreased to provide a different number of sets of discrete damping characteristics. Additionally, the means for rotating the valve pin 36, in the valve pin bore 166, could be changed, yet the same results would be achieved. Thus it is understood that the appended claims, and not the foregoing description of the preferred embodiment, particularly point out and describe what I regard to be my invention.

What is claimed is:

1. An improved adjustable damping shock absorber adapted for use with a seat of a motor vehicle, the shock absorber utilizing an incompressible fluid to provide adjustable compression and rebound damping characteristics and comprising:
   an inner cylinder having a wall, a first end and a second end and defining a cylindrical volume between its first and second ends;

first means for closing the second end of the inner cylinder;

an outer cylinder having a greater diameter than the inner cylinder and disposed coaxially about the inner cylinder so as to define an annular reservoir between the inner and outer cylinders, the outer cylinder having a first end and a second end, adjacent to the first and second ends, respectively, of the inner cylinder;

an outer cylinder having a greater diameter than the inner cylinder and disposed coaxially about the inner cylinder so as to define an annular reservoir between the inner and outer cylinders, the outer cylinder having a first end and a second end, adjacent to the first and second ends, respectively, of the inner cylinder;

second means for sealing the second end of the outer cylinder;

a piston assembly disposed in the inner cylinder and adapted to be reciprocally movable therein, with at least a portion of the piston assembly being in a slidable, fluid sealing relationship with the inner surface of the inner cylinder, the piston assembly also serving to divide the cylindrical volume so as to define a compression chamber between the piston assembly and the first means and a rebound chamber between the piston and the first end of the inner cylinder;

a piston rod extending from the piston assembly, coaxially with the longitudinal axis of the inner cylinder, beyond the first end of the inner and outer cylinders;

an inner cylinder head extending across the first ends of the inner and outer cylinder, having a centrally disposed aperture therein through which the piston rod may sealingly slide, and having a bore therein;

means for covering the first end of the inner and outer cylinders and the inner cylinder head, the covering means including means for preventing the leakage of fluid out of the first ends of the inner and outer cylinder and around the piston rod, as it moves with the piston assembly;

a replenishing passage for providing fluid communication between the reservoir and the compression chamber;

a replenishing valve disposed in the replenishing passage, and opening when fluid pressure in the reservoir exceeds the fluid pressure in the compression chamber by a predetermined replenishing pressure;

a bypass passage in the piston assembly communicating between the compression chamber and the rebound chambers;

a piston bypass valve disposed in the compression passage and adapted to open when fluid pressure in the compression chamber exceeds the fluid pressure in the rebound chamber by a predetermined compression opening pressure;

a rebound passage in the piston assembly communicating between the compression chamber and rebound chamber;

a rebound valve disposed in the rebound passage and adapted to open when the fluid pressure in the rebound chamber exceeds the fluid pressure in the compression chamber by a predetermined rebound opening pressure;

means for permitting substantially restricted fluid flow between the rebound chamber and the reservoir;

a fluid flow path disposed, at least in part, in the inner cylinder head and permitting fluid communication between the rebound chamber and the reservoir;

a valve pin disposed in a section of the fluid flow path and in part in the bore in the inner cylinder head, the valve pin being selectively movable between a first position where restricted fluid flow may occur between the rebound chamber and the reservoir, a second position where less restricted fluid flow may occur between the rebound chamber and the reservoir and a third position where still less restricted fluid flow, relative to the flow occurring in its second position, may occur between the rebound chamber and the reservoir; and means for rotationally moving the valve pin through an arc about its longitudinal axis so as to move the valve pin between its first, second and third positions, with the moving means projecting out from the outer cylinder so that the position of the valve pin may be moved from without the shock absorber, and with the valve pin including means, which cooperates with means in the bore in the inner cylinder head, for limiting the rotational movement of the valve pin in the bore in the inner cylinder head.

2. The improved shock absorber of claim 1 wherein the valve pin includes a central axial base passage extending from one end of the valve pin to a point between the ends of the valve pin; and wherein two radial passages, whose longitudinal axes are disposed in the same trans-axial plane as said point, whose longitudinal axes diverge from each other in the trans-axial plane and whose radial outer ends are spaced from each other, each of the radial passages having cross sectional area that is less than the cross sectional area of the central axial base passage.

3. The improved shock absorber of claim 2 wherein the moving means may rotate the valve pin through an arc about its longitudinal axis so as to move the pin between its first, second and third positions.

4. The improved shock absorber of claim 3 wherein the valve pin is disposed, in part, in a bore in the inner cylinder head; wherein the valve pin includes a circumferential slot defining an arc in the outer surface of the valve pin; and wherein the inner cylinder head includes means, cooperating with the slot, for limiting the rotational movement of the valve pin.

5. The improved shock absorber of claim 4 wherein the bore in the inner cylinder head includes a closed end; wherein the first end of the valve pin is disposed adjacent to the closed end of the bore; and wherein the limiting means also prevents axial movement of the valve pin within the bore.

6. The improved shock absorber of claim 1 wherein the compression chamber, the rebound chamber, and the fluid flow paths are substantially filled with fluid; and wherein the reservoir contains fluid and bag comprising means for permitting gas in the reservoir to pass into the bag, for preventing gas from passing out of the bag and for preventing fluid from entering the bag whereby gas may be removed from the fluid.

7. The improved shock absorber of claim 1 wherein the valve pin includes a circumferential slot defining an arc in the outer surface of the valve pin; wherein the inner cylinder head includes a roll pin, which cooperates with the slot, for limiting the rotational movement of the valve pin; and wherein the limiting means also prevent axial movement of the valve pin.

* * * * *